(12) United States Patent
Zhang et al.

(10) Patent No.: US 11,544,575 B2
(45) Date of Patent: Jan. 3, 2023

(54) MACHINE-LEARNING BASED APPROACH FOR MALWARE SAMPLE CLUSTERING

(71) Applicant: Fortinet, Inc., Sunnyvale, CA (US)

(72) Inventors: Jie Zhang, Langley (CA); Chao Chen, Burnaby (CA); Kuan L. Leong, Burnaby (CA)

(73) Assignee: Fortinet, Inc., Sunnyvale, CA (US)

( * ) Notice: Subject to any disclaimer, the term of this patent is extended or adjusted under 35 U.S.C. 154(b) by 357 days.

(21) Appl. No.: 16/836,883

(22) Filed: Mar. 31, 2020

(65) Prior Publication Data

US 2021/0304013 A1 Sep. 30, 2021

(51) Int. Cl.
G06F 21/56 (2013.01)
G06N 5/00 (2006.01)
G06N 5/04 (2006.01)
G06N 20/20 (2019.01)

(52) U.S. Cl.
CPC .......... *G06N 5/003* (2013.01); *G06F 21/565* (2013.01); *G06N 5/04* (2013.01); *G06N 20/20* (2019.01); *G06F 2221/033* (2013.01)

(58) Field of Classification Search
CPC .......... G06N 5/003; G06N 5/04; G06N 20/20; G06F 21/565; G06F 2221/033
See application file for complete search history.

(56) References Cited

U.S. PATENT DOCUMENTS 8,375,450 B1* 2/2013 Oliver ................... G06F 21/564
713/181

10,546,123 B1* 1/2020 Lan ....................... G06F 21/568
2020/0233960 A1* 7/2020 Copty ..................... G06N 20/00

OTHER PUBLICATIONS

Bayer et al., "Scalable, Behavior-Based Malware Clustering", NDSS 2009, 16th Annual Network and Distributed System Security Symposium, Feb. 8-11, 2009, 18 pages.*
Pai, Swathi, "A Comparison of Clustering Techniques for Malware Analysis", San Jose State University, Spring May 25, 2015, 70 pages.
Bayer, Ulrich et al., "Scalable, Behavior-Based Malware Clustering", Secure Systems Lab/Technical University Vienna, University of California, Feb. 10, 2009,26 pages.

(Continued)

*Primary Examiner* — Matthew T Henning
(74) *Attorney, Agent, or Firm* — Law Office Of Dorian Cartwright; Dorian Cartwright

(57) ABSTRACT

Systems and methods for a machine learning based approach for identification of malware using static analysis and a machine-learning based automatic clustering of malware are provided. According to various embodiments of the present disclosure, a processing resource of a computer system receives a potential malware sample. A plurality of feature vectors is extracted from the potential malware sample and is converted into an input vector. A byte sequence is generated by walking a plurality of decision trees based on the input vector. Further, a hash value for the byte sequence is calculated and a determination is made regarding whether the hash value matches a malware hash value of a plurality of malware hash values corresponding to a known malware sample. Upon said determination being affirmative, the potential malware sample is classified as malware and is associated with a malware family of the known malware sample.

17 Claims, 10 Drawing Sheets

(56) References Cited

OTHER PUBLICATIONS

Rosli, Nur Adibah et al., "Clustering Analysis for Malware Behavior Detection Using Registry Data", International Journal of Advanced Computer Science and Applications, vol. 10, No. 12, 2019, pp. 93-102.

Li, Yuping, "Similarity Based Large Scale Malware Analysis: Techniques and Implications", University of South Florida Scholar Commons, Jun. 2018, 119 pages.

* cited by examiner

```
1    // bit Routines fake structure
2
3    struct bitroutine {
4         DWORD    count;
5         BYTE     bits[count];
6    };
```

FIG. 5A

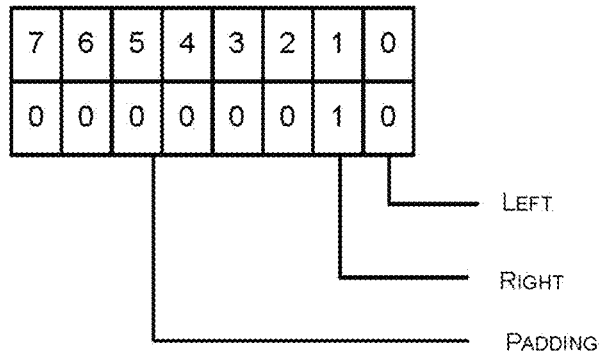

FIG. 5B

```
1    // Sample_bit_Routines = { Bit_Routine1,  Bit_Routine2,..... Bit_Routine100,};
2    // Sample_bit_Routines = { Bit_Routine1',  Bit_Routine2',..... Bit_Routine100'};
3
4    Int tree_Count = 100;
5    Int Same_Count = 0;
6
7    for (Int i = 0; i<tree_count; i++)
8    {
9        hash_Code1 = calculate_Hash_Code(Sample_bit_routines[i]);
10       hash_Code1 = calculate_Hash_Code(Sample_bit_routines[i]);
11       if(Hash_code == hash_code2)
12       {
13          same_Seq_count ++;
14       }
15   }
16
17   double similarity = (double)same_seq_count / tree_count;
```

FIG. 6

MACHINE-LEARNING BASED APPROACH FOR MALWARE SAMPLE CLUSTERING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to malware clustering. In particular, embodiments of the present invention relate to an identification of malware using static analysis and a machine-learning based automatic clustering of malware samples in respective malware groups based on a prediction score.

Description of the Related Art

Malware may pose as a serious threat to computing systems of a network, and detection of malware poses a difficult challenge as malicious software constantly evolves. Security companies attempt to identify and combat malware in several ways. For example, security vendors may create and deploy a set of phase 1 signatures to identify malware. However, since hundreds of thousands of new malware and potentially unwanted applications are discovered each day, the set of signatures quickly explodes leading to the mechanism being rendered ineffective. In addition, phase 1 signatures cannot identify malware samples from an unknown file set. While general signatures can be created to slow the growth, the process of creating general signatures involves manual steps performed by experienced analysts. Such manual signature generation processes have no hope of keeping up with the pace of new malware.

Another approach for identifying malware involves behavior-based or dynamic analysis (e.g., sandbox environments). These approaches have their own limitations, including the time consuming nature of the process and sandbox evasion technology. For example, assuming a security vendor must process a million unknown samples per day and sandbox analysis takes a minute or more per sample, it is clear that many sandboxes would need to be run in parallel to keep up. Additionally, some malware avoid detonating when the environment in which they are being run reveals characteristics inconsistent with their intended environment. Furthermore, existing sandbox environments cannot handle malformed or corrupted malware.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 5A is a pseudo code fragment illustrating a bit routine structure in accordance with an embodiment of the present invention.

FIG. 5B illustrates a data structure that may be used to store the bit values of the result of walking the decision tree in accordance with an embodiment of the present invention.

FIG. 6 is a pseudo code fragment 600 illustrating comparison logic for determining similarity of two samples in accordance with an embodiment of the present invention.

DETAILED DESCRIPTION

Figure 1:
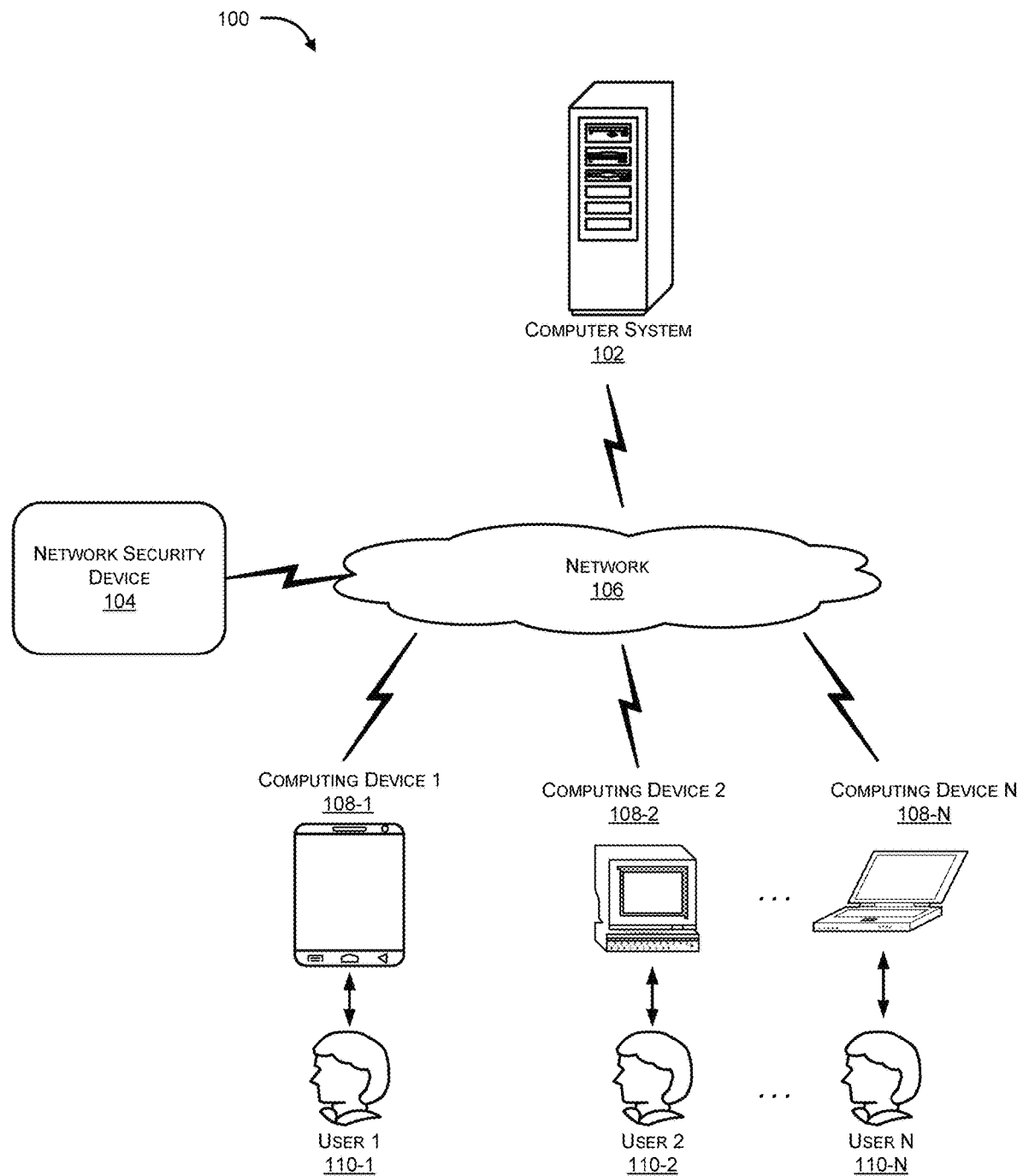
FIG. 1 illustrates a network architecture in which aspects of the present invention maybe implemented in accordance with an embodiment of the present invention.

Systems and methods are described for a machine-learning based approach for identification of malware using static analysis and a machine-learning based automatic clustering of malware. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

In an embodiment, a processing resource of a computer system receives a potential malware sample. The processing resource extracts multiple feature vectors from the potential malware sample, wherein the multiple feature vectors represent values of static features of the potential malware sample. The multiple feature vectors is converted into an input vector. Further, the processing resource generates a byte sequence by walking various decision trees based on the input vector, wherein the various decision trees are associated with a machine-learning model that has been trained based on the static features of a set of known malware samples. A hash value for the byte sequence is calculated. Furthermore, it is determined whether the hash value matches a malware hash value of a multiple malware hash values corresponding to a known malware sample of the set of known malware samples, and when said determining is affirmative, the processing resource classifies the potential malware sample as malware and associates the malware with a malware family of the known malware sample. In yet another embodiment, when the hash value of the malware matches to at least one of the malware hash value of the multiple malware hash values corresponding to the at least one of known malware sample of the set of known malware samples, the processing resource associates the malware with the malware family of the matched at least one of known malware sample.

FIG. 1 illustrates a network architecture 100 in which aspects of the present invention maybe implemented in accordance with an embodiment of the present invention. In the context of the present example, a computer system 102 is coupled to network 106 and may be associated with a cloud-based service, for example, that receives samples of potential malware for identification. For example, if a file is identified as potentially being malware by a network security device 104, network security device 104 may submit the file to computer system 102 to receive a final determination regarding whether or not the file is malware.

Further, computing devices 108-1, 108-2 . . . 108-N (which may be collectively referred to herein as computing devices 108 and may be individually referred to herein as computing device 108) may be coupled in communication with network 106 and may include, but are not limited to, personal computers, smart devices, web-enabled devices, hand-held devices, laptops, mobile phones and the like, and may allow users 110-1, 110-2 . . . 110-N (which may be collectively referred to herein as users 110 and may be individually referred to herein as user 110) to interact with resources associated with the network 106.

Those skilled in the art will appreciate that, network 106 may be a wireless network, a wired network or a combination thereof that can be implemented as one of the different types of networks, such as an Intranet, a. Local Area Network (LAN), a Wide Area Network (WAN), the Internet, and the like. Further, network 106 may be a dedicated network or a shared network. A shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

In an embodiment, computer system 102 may represent one of a number of potential other computer systems collectively responsible for performing static analysis of potential malware samples from a variety of sources, for example, subscribers of a cloud-based service. For example, responsive to receipt by computer system 102 of a potential malware sample, computer system 102 may extract various feature vectors from the potential malware sample. According to one embodiment, a predefined set of feature vectors may have previously been identified based on domain-specific knowledge of a group of security researchers. Alternatively, a machine-learning based approach may be used to identify feature vectors. Non-limiting examples of feature vectors that may be used in connection with performing static analysis of files in the Portable Executable (PE) file format include PE metadata (e.g., the PE entry point, Import Table, Resource Information, DOTNET structural data, text strings and so on), suspicious points and mathematical model data (e.g., entropy and others). After the computer system 102 identifies the features, further data mining and data cleaning may be performed (e.g., feature selection, data normalization/standardization and so on). The extracted feature vectors may be converted into an input vector. Subsequently, a byte sequence may be generated by computer system 102 by walking multiple decision trees based on the input vector. The multiple decision trees may be associated with a machine-learning model that has been trained based on the static features of a set of known malware samples. Further, a hash value for the byte sequence may be calculated and to determine whether the hash value matches a malware hash value of multiple malware hash values corresponding to the set of known malware samples. When a match is found, the potential malware sample may be classified as malware and associated with a malware family of the known malware sample.

When the hash value does not match any of the multiple malware hash values (meaning the potential malware sample is not an exact match to any of the known malware samples), computer system 102 may proceed to determine if the byte sequence of the potential malware sample meets a predetermined or configurable threshold of similarity with a malware byte sequence of a particular known malware sample of the set of known malware samples. When such a threshold of similarity is found, the potential malware sample may be classified as malware, and treated as a variant of a malware family of the particular known malware sample by adding the potential malware sample to the set of known malware samples as part of a new cluster within the set of known malware samples.

In an embodiment, the machine-learning model can include a Random Forest model and the various decision trees may be binary decision trees. The binary decision trees may be Classification and Regression Trees (CART).

As described in further detail below, in an embodiment, the walking of the various decision trees based on the input vector may include for each a binary decision tree of the various decision trees, evaluating an expression involving one or more features of the various features associated with a current node starting with a root node of the binary decision tree and ending at a leaf node of the binary decision tree. When the evaluation causes a left branch of the current node to be taken, a first value can be assigned to a portion of the byte sequence corresponding to the current node. Further, when the evaluation causes a right branch of the current node to be taken, a second value can be assigned to the portion of the byte sequence.

Figure 2:
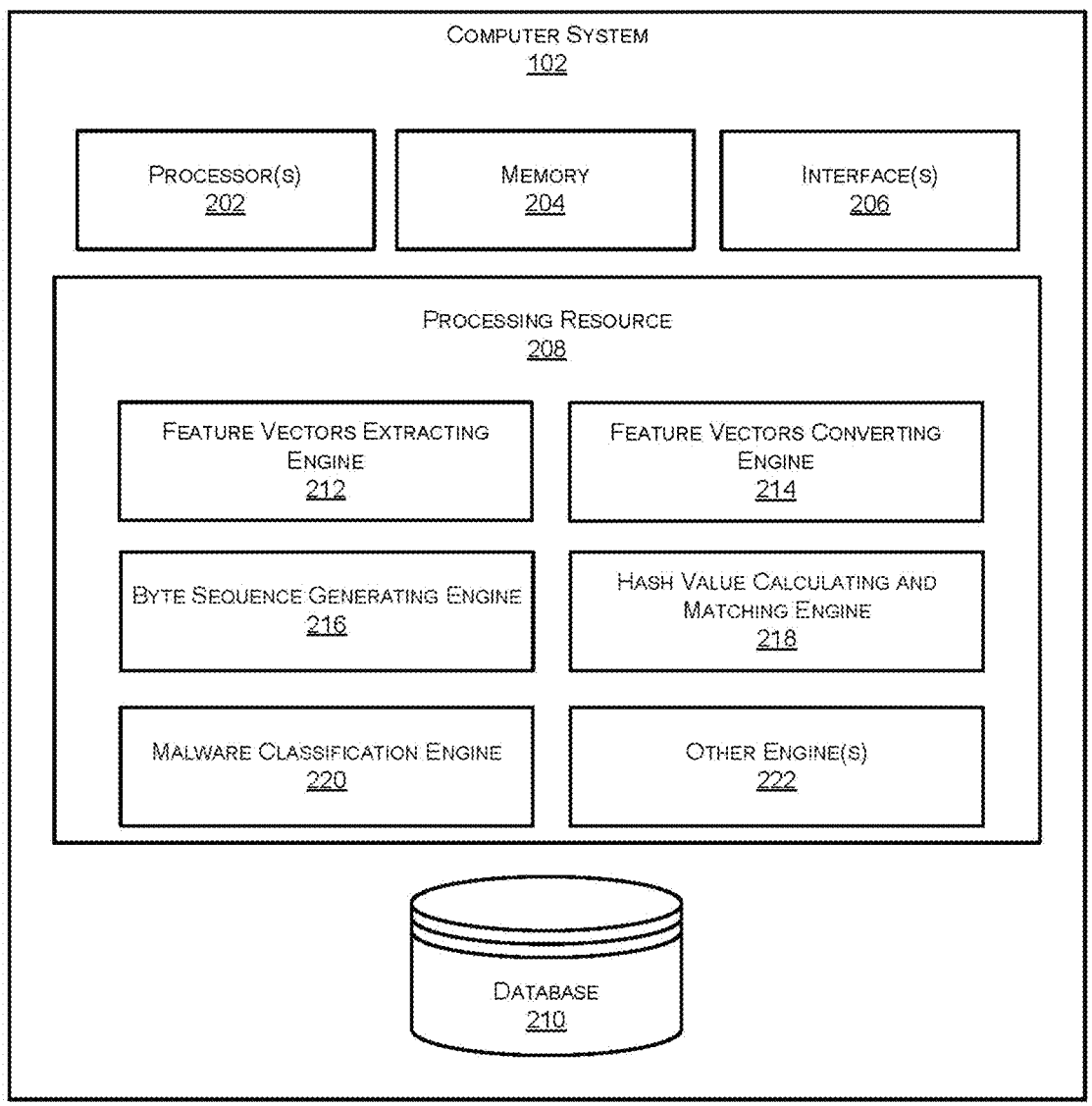
FIG. 2 is a block diagram illustrating functional components of a computer system in which aspects of the present invention may be implemented in accordance with an embodiment of the present invention.

FIG. 2 is a block diagram 200 illustrating functional components of a computer system 102 in which aspects of the present invention may be implemented in accordance with an embodiment of the present invention. In the context of the present example, computer system 102 can include one or more processing resources (e.g., processor(s) 202). Processor(s) 202 can be implemented as one or more microprocessors, microcomputers, microcontrollers, digital signal processors, central processing units, logic circuitries, and/or any devices that manipulate data based on operational instructions. Among other capabilities, processor(s) 202 are configured to fetch and execute computer-readable instructions stored in a memory 204 of computer system 102. Memory 204 can store one or more computer-readable instructions or routines, which may be fetched and executed to create or share the data units over a network service. Memory 204 can include any non-transitory storage device including, for example, volatile memory such as RAM, or non-volatile memory such as EPROM, flash memory, and the like. In an example embodiment, memory 204 may be a local memory or may be located remotely, such as a server, a file server, a data server, and the Cloud.

Computer system 102 can also include one or more Interface(s) 206. Interface(s) 206 may include a variety of interfaces, for example, interfaces for data input and output devices, referred to as I/O devices, storage devices, and the like. Interface(s) 206 may facilitate communication of computer system 102 with various devices coupled to network security device 104. Interface(s) 206 may also provide a communication pathway for one or more components of network security device 104. Examples of such components include, but are not limited to, processing resource 208 and database 210.

Processing resource 208 can be implemented as a combination of hardware and software or firmware programming (for example, programmable instructions) to implement one or more functionalities of resource 208. In the examples described herein, such combinations of hardware and software or firmware programming may be implemented in several different ways. For example, the programming for the resource 208 may be processor executable instructions stored on a non-transitory machine-readable storage medium and the hardware for resource 208 may include a processing resource (for example, one or more processors), to execute such instructions. In the examples, the machine-readable storage medium may store instructions that, when executed by the processing resource, implement resource 208. In such examples, computer system 102 can include the machine-readable storage medium storing the instructions and the processing resource to execute the instructions, or the machine-readable storage medium may be separate but accessible to computer system 102 and the processing resource. In other examples, processing resource 208 may be implemented by electronic circuitry. Database 210 can include data that is either stored or generated as a result of functionalities implemented by any of the components of processing resource 208.

In an example, processing resource 208 can include a feature vectors extracting engine 212, a feature vectors converting engine 214, a byte sequence generating engine 216, a hash value calculating and matching engine 218, a malware classification engine 220, and other engine(s) 222. Other engine(s) 222 can implement functionalities that supplement applications or functions performed by computer system 102 or processing resource 208.

According to an embodiment, the feature vectors extracting engine 212 extracts multiple feature vectors from a potential malware sample received by a processing resource of a computer system. The multiple feature vectors represent values of static features of the potential malware sample. The feature vectors converting engine 214 converts the multiple feature vectors into an input vector. The byte sequence generating engine 216, generates a byte sequence by walking various decision trees based on the input vector. The walking the various decision trees based on the input vector includes evaluating an expression involving one or more features of the multiple features associated with a current node starting with a root node of the binary decision tree and ending at a leaf node of the binary decision tree. When the evaluation causes a left branch of the current node to be taken, a first value is assigned to a portion of the byte sequence corresponding to the current node. Further, when the evaluation causes a right branch of the current node to be taken, a second value is assigned to the portion of the byte sequence.

The various decision trees may be associated with a machine-learning model that has been trained based on the static features of a set of known malware samples. According to one embodiment, the machine-learning model is a Random Forest model and the various decision trees comprises binary decision trees. As can be appreciated by those skilled in the art, the binary decision trees can be Classification and Regression Trees (CART), where each of a node of the CART trees has at most two branches. Further, the hash value calculating and matching engine 218, calculates a hash value for the byte sequence and determines whether the hash value matches a malware hash value corresponding to a known malware sample of the set of known malware samples. Upon the determination being affirmative, the malware classification engine 220, classifies the potential malware sample as malware and associates the malware with a malware family of the known malware sample.

However, when the determination is negative, a further determination may be made regarding whether the byte sequence (from which the hash value was calculated) meets a predetermined or configurable threshold of similarity with a malware byte sequence of a particular known malware sample of the set of known malware samples. When the determination of whether the byte sequence meets a predetermined or configurable threshold of similarity is affirmative, the potential malware sample is classified as malware, and is treated as a variant of a malware family of the particular known malware sample by adding the potential malware sample to the set of known malware samples as part of a new cluster within the set of known malware samples.

Figure 3:
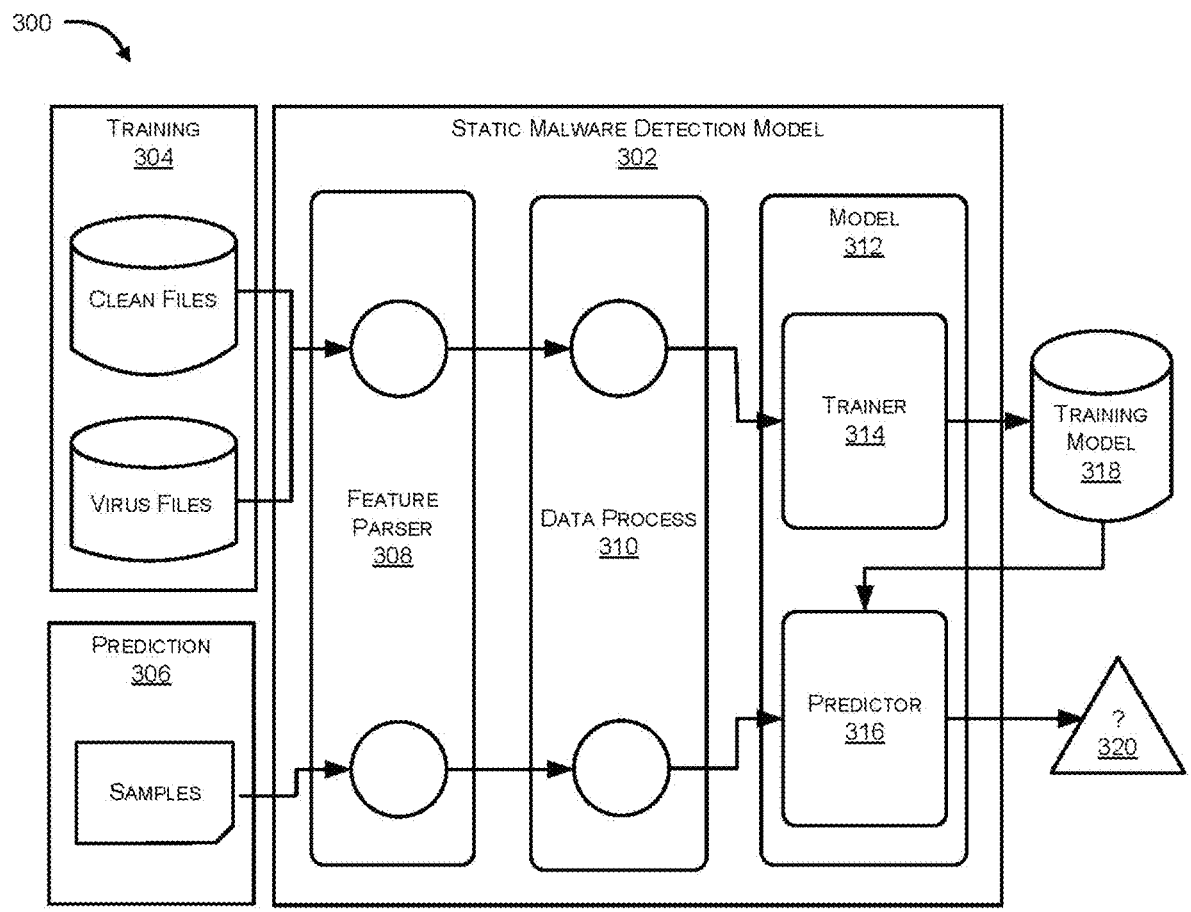
FIG. 3 is a block diagram illustrating a static malware detection model in accordance with an embodiment of the present invention.

FIG. 3 is a block diagram 300 illustrating a static malware detection model 302 in accordance with an embodiment of the present invention. In the context of the present example, static malware detection model 302 can include a training unit 304 that can include a set of clean files and virus infected files. The set of clean files and virus infected files can be fed as input into a feature parser unit 308.

In an embodiment, static malware detection model 302 with machine-learning can use domain-specific knowledge to extract a lot of features from samples e.g., portable executable (PE) samples. As an example, the features can include PE meta-data (such as PE entry point, import table, resource information, DOTNET structural data, text strings, etc.), suspicious points and mathematical model data (e.g., entropy and others).

When feature parser unit 308 gains the features, a data mining and data cleaning operation can be performed on the features. The data mining and data cleaning operation can include feature selection, data normalization, and data standardization operations, which may be performed by a data process unit 310 to convert the feature data to input data vectors for use by model 312. During training, the input data vector can be labeled and fed into a training model 318 via trainer 314 present inside model 312 that receives as input processed data from data process unit 310. When the training is finished, data can be gathered at training model 318. During a prediction phase, predictor 316 of static malware detection model 302 can scan a target input, extract feature data and convert the feature data to an input vector. Then, the model can use training model 318 to predict a result at 320, where during the prediction, training model data from training model 318 is used as input at predictor 316. In an embodiment, model 312 can be a random forest model and can be used as training and predicting model. The Random Forest model can be composed of multiple binary decision trees. Further, the binary decision trees can be Classification and Regression Trees (CART), where each of a node of the CART trees has at most two branches.

Figure 4:
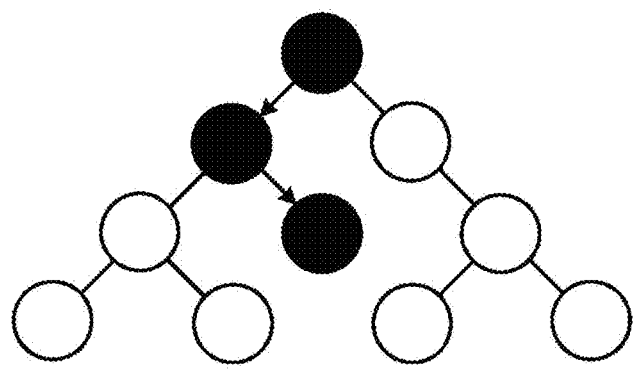
FIG. 4 is a hierarchical diagram illustrating an exemplary binary decision tree in accordance with an embodiment of the present invention.

FIG. 4 is a hierarchical diagram 400 illustrating an exemplary binary decision tree in accordance with an embodiment of the present invention. In an embodiment, the walking of the plurality of decision trees can be based on an input vector and can be used for prediction of a potential malware sample. In an embodiment, one or more potential malware samples are deemed to have similar attributes if the samples pass through the same path from the root node to a leaf node since each decision of a tree node can represent an attribute comparison (e.g., an expression involving one or more features).

FIG. 5A is a pseudo code fragment illustrating a bit routine structure in accordance with an embodiment of the present invention. In an embodiment, the plurality of feature vectors extracted from a potential malware sample can be converted into an input vector. The walking of various decision trees can be based on the input vector and can include an evaluation of an expression involving one or more features associated with a current node starting with a root node of the binary decision tree and ending at a leaf node of the binary decision tree. According to one embodiment, a count, representing the number of levels of the decision tree is represented as a double word (DWORD) and an array of count number of bits is used to store information regarding whether for a particular level within the decision tree, the evaluation of the input vector with respect to the node at issue resulted in taking the left branch or the right branch of the node.

As can be appreciated by those skilled in the art, when the evaluation causes a left branch of the current node to be taken, a first value may be assigned to a portion of the byte sequence corresponding to the current node. Further, when the evaluation causes a right branch of the current node to be taken, a second value may be assigned to the portion of the byte sequence. As an example, by convention, a value of 0 can be stored in a bit position corresponding to the current level within the decision tree to represent a left branch selection and a value of 1 can be stored in the bit position to represent a right branch selection. While this convention will be used to explain various examples described herein, those skilled in the art will appreciate the convention may be reversed and a value of 1 may be used to represent that a left branch was taken at a particular level of the decision tree and a value of 0 may be used to represent that a right branch was taken at the particular level. An example of the bit array (bits[count]) that may be used to store the bit values resulting from walking a single decision tree is described below with reference to FIG. 5B.

FIG. 5B illustrates a data structure 550 that may be used to store the bit values of the result of walking the decision tree in accordance with an embodiment of the present invention. Since only two bits are used, in the context of the present example to represent the path taken when walking the decision tree of FIG. 4 (e.g., a left branch at level 0 of the tree, followed by a right branch at level 1 of the tree), the remainder of the bits (e.g., bit 7 to bit 2 may be padded with zeroes). The padding of the bits can be done to make a bit routine byte aligned, and the bit routine count can be stored as a DWORD with e.g., 4 bytes.

In an embodiment, when there are 2 bits in the bit routine: left (0) and right (1). Due to storage of the bits in a path, as can be appreciated by those skilled in the art, a byte can be represented as e.g., a byte=0x02 plus 2 bits size as is obtained as the DWORD. Further, a bit routine structure sequence (which may also be referred to herein as a byte sequence) can be obtained (e.g., on a little-endian platform) and can be represented as {0x02, 0x00, 0x00, 0x00, 0x02}. In a random forest model, multiple binary decision trees can be used to predict a sample. For example, if 100 trees are used in a random forest model, 100 bit routines would be performed per sample, each producing a corresponding byte sequence. In the context of the present example, running potential malware samples against 100 decision trees results in 100 byte sequences (e.g., byte_seqs={byte_seq1, byte_seq2, . . . , byte_seg100}) for each sample.

FIG. 6 is a pseudo code fragment 600 illustrating comparison logic for determining similarity of two samples in accordance with an embodiment of the present invention. In an embodiment, when two samples have the same bit routines, it can be considered that the two samples have very similar attributes and thus can ease in calculating similarity of two received samples.

According to one embodiment, in order to more efficiently compare sample bit routines, all bit routines (byte sequences) for a sample are concatenated together to form a byte sequence representing the result of walking all decision trees and a hash value is calculated for the byte sequence. As such, when two samples have the same hash value, the two samples can be considered to have same bit routines and all the samples which have the same unique hash values can be associated and grouped into the same (group) malware family. In an embodiment, when a hash value of a potential malware sample at issue matches a malware hash value corresponding to a known malware sample of a set of known malware samples, the potential malware sample can be classified as malware and the malware is associated with the malware family of the known malware sample.

In an embodiment, when hash value does not match to a malware hash value of a known malware sample of the set of known malware samples it can be determined whether the byte sequence meets a predetermined or configurable threshold of similarity with a malware byte sequence of a particular known malware sample of the set of known malware samples. When the determination of whether the byte sequence meets a predetermined or configurable threshold of similarity is affirmative the potential malware sample can be declared as malware, and treated as a variant of a malware family of the particular known malware sample by adding the potential malware sample to the set of known malware samples as part of a new cluster within the set of known malware samples.

Figure 7A:
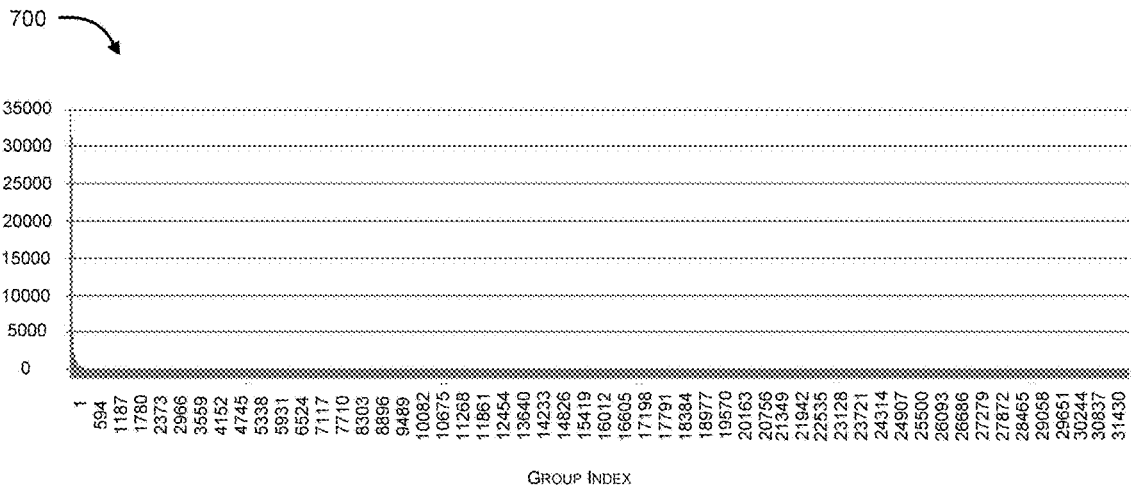
FIGS. 7A, 7B and 7C are exemplary graphs illustrating unique hash values for distinct sample counts in each group in accordance with an embodiment of the present invention.
Figure 7B:
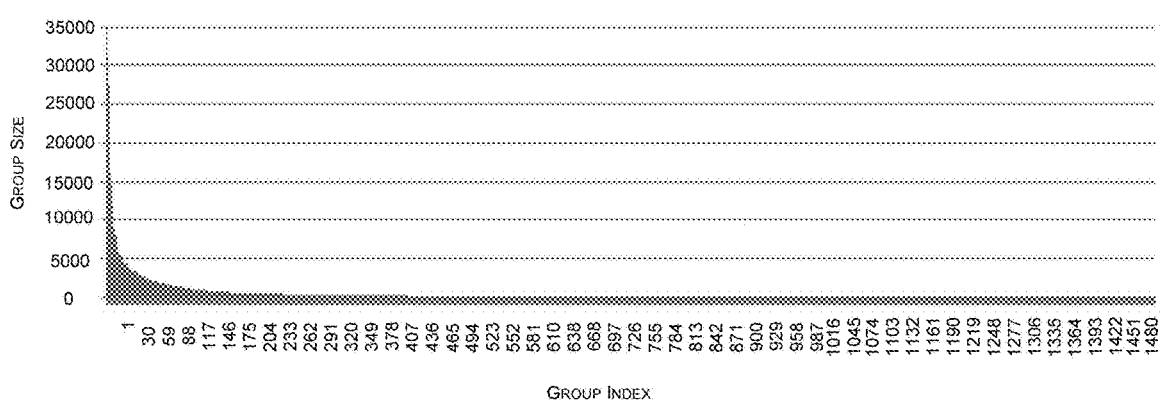
Figure 7C:
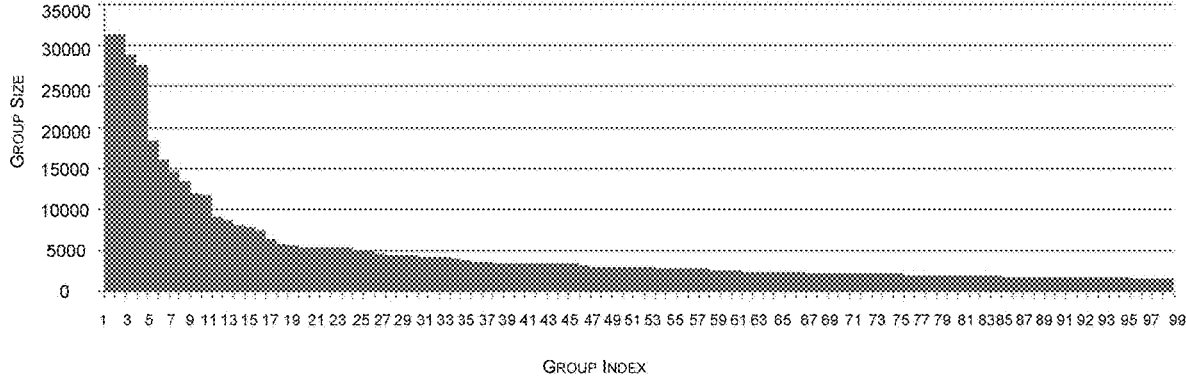

FIGS. 7A, 7B and 7C are exemplary graphs illustrating unique hash values for distinct sample counts in each group in accordance with an embodiment of the present invention. In context of the present example, as is illustrated at 700, FIG. 7A is a testing file set, with e.g., 954,747 samples in total, that is scanned to retrieve e.g., 94,536 unique hash values. At Y-axis is illustrated a samples count in each group and at X-axis is illustrated a group ID. As can be appreciated by those skilled in the art, after the scanning a huge count of the hash values (~10% samples) is obtained, and where most of the groups are in very small size. For example, most of the groups contain only one to very few samples. In another embodiment, as is illustrated at 720, FIG. 7B, and 740 at FIG. 7C are stripped versions of some smallest size groups corresponding to top 1500 groups with unique hash values and top 100 groups with unique hash values respectively.

Figure 8A:
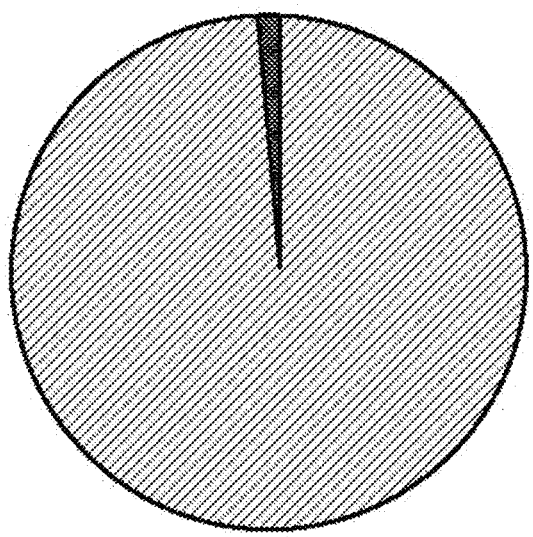
FIGS. 8A-B are exemplary static summary pie charts illustrating groups proportion and samples proportion respectively in accordance with an embodiment of the present invention.
Figure 8B:
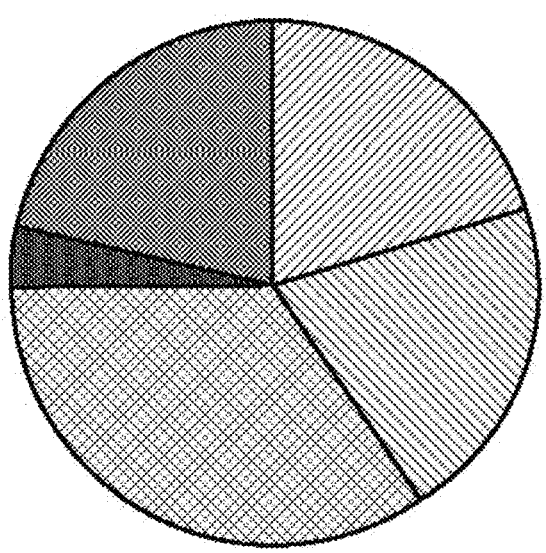

FIGS. 8A-B are exemplary static summary pie charts illustrating groups proportion and samples proportion respectively in accordance with an embodiment of the present invention. In context of the present example are illustrated static summary charts, with a groups proportion chart illustrated at 800, FIG. 8A and a samples proportion chart illustrated at 850, FIG. 8B. As an example, based on the charts it can be determined that only 1300 hash values can cover about 80% samples, and upon using a regular hash to detect the samples around 750,000+ hashes need to be performed.

Figure 9A:
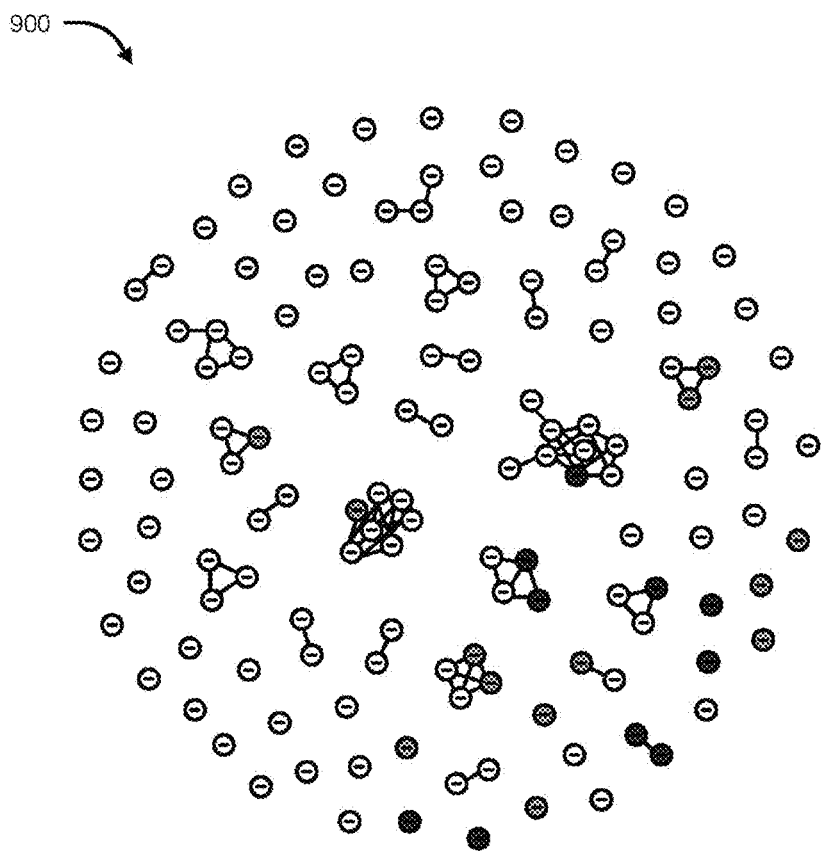
FIGS. 9A-B are exemplary vision charts illustrating all hash values where group size is larger than 1,000 samples in accordance with an embodiment of the present invention.
Figure 9B:
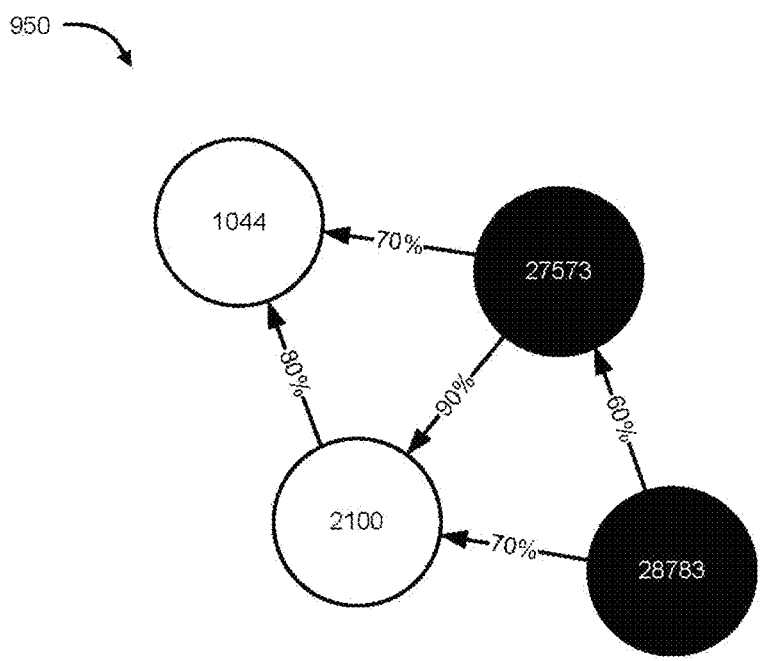

FIGS. 9A-B are exemplary vision charts illustrating all hash values where group size is larger than 1,000 samples in accordance with an embodiment of the present invention. In an embodiment, as is illustrated at 900, FIG. 9A is a vision chart for all hash values where group size is larger than 1,000 samples. For example, black node represents a group size: >=10,000+; gray node represents a group size: >=5,000, and white node represents a group size: >=1,000. Further, at 950, FIG. 9B are illustrated multiple similarity groups, with different colors, that are linked together. As can be appreciated by those skilled in the art, a percentage as illustrated on each of an edge represents a level of similarity of two of the connected groups.

Figure 10A:
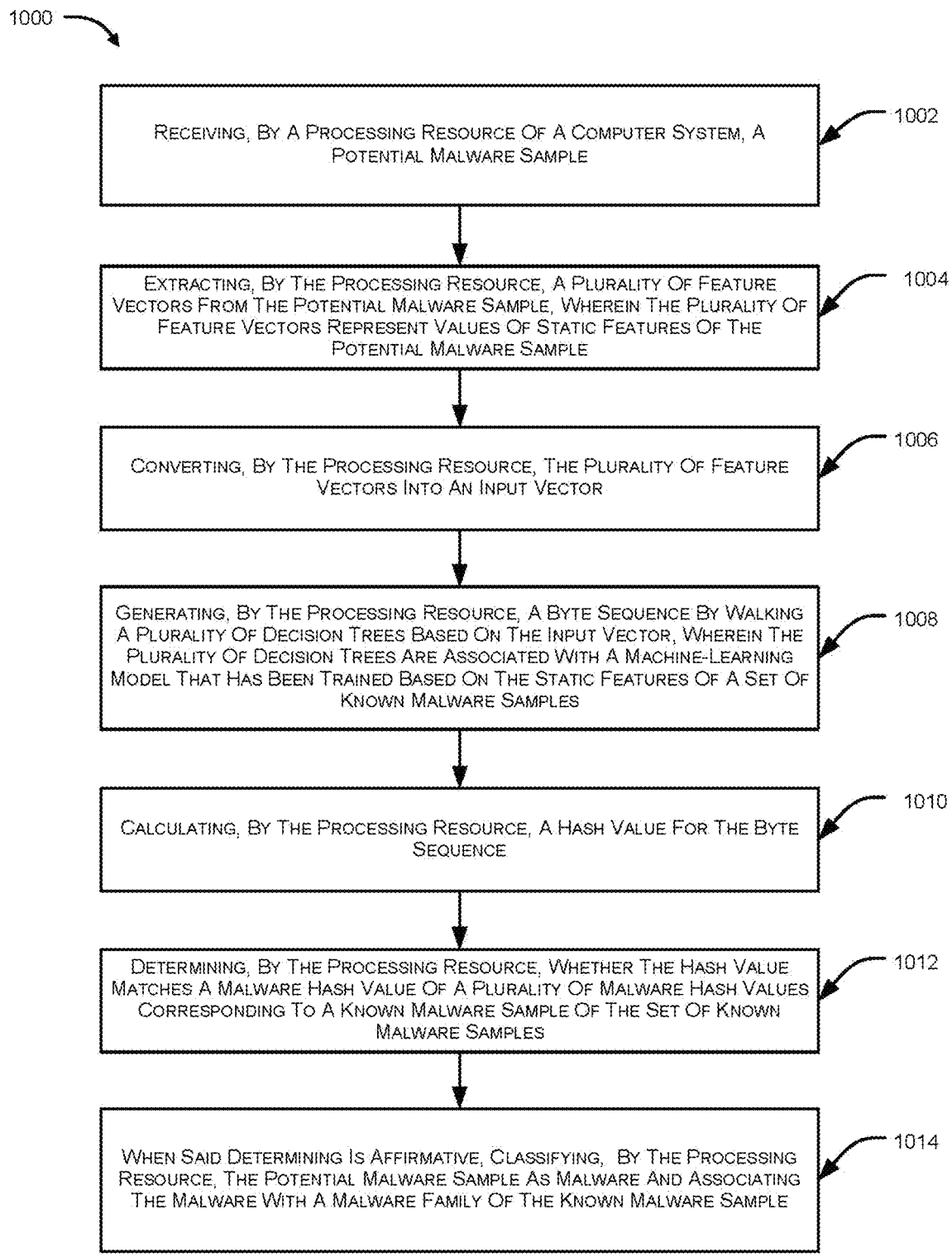
FIG. 10A is a flow diagram illustrating a classification process for a potential malware sample in accordance with an embodiment of the present invention.

FIG. 10A is a flow diagram 1000 illustrating a classification process for a potential malware sample in accordance with an embodiment of the present invention. The process described with reference to FIG. 10A may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 1100 described with reference to FIG. 11 below.

As is illustrated at block 1002, a potential malware sample is received at a processing resource of a computer system. At block 1004, a plurality of feature vectors are extracted from the potential malware sample. The plurality of feature vectors represents values of static features of the potential malware sample. At block 1006, the processing resource converts the plurality of feature vectors into an input vector. Further, at block 1008, the processing resource generates a byte sequence by walking a plurality of decision trees based on the input vector. The plurality of decision trees are associated with a machine-learning model that has been trained based on the static features of a set of known malware samples. At block 1010, the processing resource calculates a hash value for the byte sequence. At block 1012, the processing resource determines whether the hash value matches a malware hash value of a plurality of malware hash values corresponding to a known malware sample of the set of known malware samples. At block 1014, when said determining is affirmative, the processing resource classifies the potential malware sample as malware and associates the malware with a malware family of the known malware sample.

Figure 10B:
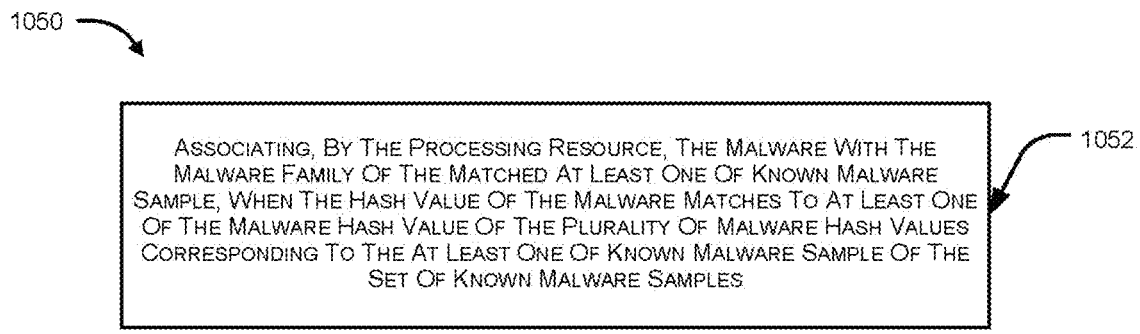
FIG. 10B is a flow diagram illustrating a clustering process for known malware samples in accordance with an embodiment of the present invention.

FIG. 10B is a flow diagram 1050 illustrating a clustering process for known malware samples in accordance with an embodiment of the present invention. The process described with reference to FIG. 10B may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the computer system 1100 described with reference to FIG. 11 below.

As is illustrated at block 1052, when the hash value of the malware matches to at least one of the malware hash value of the plurality of malware hash values corresponding to the at least one of known malware sample of the set of known malware samples, the processing resource associates the malware with the malware family of the matched at least one of known malware sample.

Figure 11:
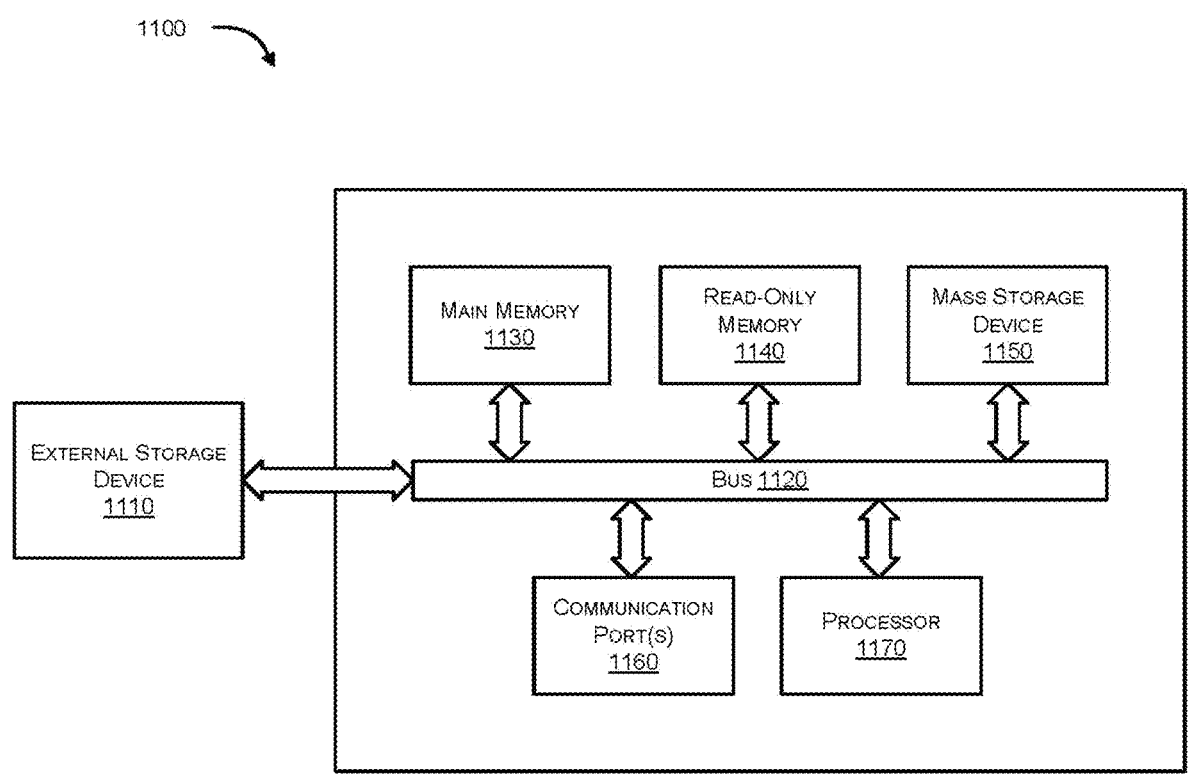
FIG. 11 illustrates an exemplary computer system in which or with which embodiment of the present invention may be utilized.

FIG. 11 illustrates an exemplary computer system 1100 in which or with which embodiment of the present invention may be utilized.

FIG. 11 illustrates an exemplary computer system 1100 in which or with which embodiment of the present invention may be utilized. As shown in FIG. 11, computer system includes an external storage device 1110, a bus 1120, a main memory 1130, a read only memory 1140, a mass storage device 1150, a communication port 1160, and a processor 1170.

Those skilled in the art will appreciate that computer system 1100 may include more than one processor 1170 and communication ports 1160. Examples of processor 1170 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1170 may include various modules associated with embodiments of the present invention.

Communication port 1160 can be any of an RS-232 port for use with a modem based dialup connection, a 10/100 Ethernet port, a Gigabit or 10 Gigabit port using copper or fiber, a serial port, a parallel port, or other existing or future ports. Communication port 1160 may be chosen depending on a network, such a Local Area Network (LAN), Wide Area Network (WAN), or any network to which computer system connects.

Memory 1130 can be Random Access Memory (RAM), or any other dynamic storage device commonly known in the art. Read only memory 1140 can be any static storage device(s) e.g., but not limited to, a Programmable Read Only Memory (PROM) chips for storing static information e.g. start-up or BIOS instructions for processor 1170.

Mass storage 1150 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1120 communicatively couples processor(s) 1170 with the other memory, storage and communication blocks. Bus 1120 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1170 to software system.

Optionally, operator and administrative interfaces, e.g. a display, keyboard, and a cursor control device, may also be coupled to bus 1120 to support direct operator interaction with computer system. Other operator and administrative interfaces can be provided through network connections connected through communication port 1160. External storage device 1110 can be any kind of external hard-drives, floppy drives, IOMEGA® Zip Drives, Compact Disc— Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
   receiving, by a processing resource of a computer system, a potential malware sample;
   extracting, by the processing resource, a plurality of feature vectors from the potential malware sample, wherein the plurality of feature vectors represent values of static features of the potential malware sample;
   converting, by the processing resource, the plurality of feature vectors into an input vector;
   generating, by the processing resource, a byte sequence by walking a plurality of decision trees based on the input vector, wherein the plurality of decision trees are associated with a machine-learning model that has been trained based on the static features of a set of known malware samples, wherein the machine-learning model comprises a Random Forest model and wherein the plurality of decision trees comprises binary decision trees;
   calculating, by the processing resource, a hash value for the byte sequence;
   determining, by the processing resource, whether the hash value matches a malware hash value of a plurality of malware hash values corresponding to a known malware sample of the set of known malware samples; and
   when said determining is affirmative, classifying, by the processing resource, the potential malware sample as malware and associating the malware with a malware family of the known malware sample.

2. The method of claim 1, further comprising when said determining is negative:
   determining, by the processing resource, whether the byte sequence meets a predetermined or configurable threshold of similarity with a malware byte sequence of a particular known malware sample of the set of known malware samples; and
   when said determining whether the byte sequence meets a predetermined or configurable threshold of similarity is affirmative:

classifying, by the processing resource, the potential malware sample as malware; and treating, by the processing resource, the malware as a variant of a malware family of the particular known malware sample by adding the potential malware sample to the set of known malware samples as part of a new cluster within the set of known malware samples.

3. The method of claim 1, wherein said walking the plurality of decision trees based on the input vector comprises:

for each a binary decision tree of the plurality of decision trees:

evaluating an expression involving one or more features of the plurality of features associated with a current node starting with a root node of the binary decision tree and ending at a leaf node of the binary decision tree;

when said evaluating causes a left branch of the current node to be taken, assigning a first value to a portion of the byte sequence corresponding to the current node; and when said evaluating causes a right branch of the current node to be taken, assigning a second value to the portion of the byte sequence.

4. The method of claim 1, wherein the binary decision trees are Classification and Regression Trees (CART), where each of a node of the CART trees has at most two branches.

5. The method of claim 1, wherein when the hash value of the malware matches to at least one of the malware hash value of the plurality of malware hash values corresponding to the at least one of known malware sample of the set of known malware samples, associating, by the processing resource, the malware with the malware family of the matched at least one of known malware sample.

6. The method of claim 1, wherein the hash value is calculated by concatenating the generated byte sequence to form a unique predefined byte sequence.

7. The method of claim 1, wherein the plurality of feature vectors comprises any or a combination of entry point information, an import table, resource information, a DOTNET structural data, and a set of text strings pertaining to the potential malware sample.

8. The method of claim 1, wherein the processing resource is configured on a cloud based service.

9. A non-transitory computer-readable storage medium embodying a set of instructions, which when executed by a processing resource of a computing system, causes the processing resource to perform a method comprising:

receiving a potential malware sample;

extracting a plurality of feature vectors from the potential malware sample, wherein the plurality of feature vectors represent values of static features of the potential malware sample;

converting the plurality of feature vectors into an input vector;

generating a byte sequence by walking a plurality of decision trees based on the input vector, wherein the plurality of decision trees are associated with a machine-learning model that has been trained based on the static features of a set of known malware samples, wherein the machine-learning model comprises a Random Forest model and wherein the plurality of decision trees comprises binary decision trees;

calculating a hash value for the byte sequence;

determining whether the hash value matches a malware hash value of a plurality of malware hash values corresponding to a known malware sample of the set of known malware samples; and when said determining is affirmative, classifying the potential malware sample as malware and associating the malware with a malware family of the known malware sample.

10. The non-transitory computer-readable storage medium of claim 9, further comprising when said determining is negative:

determining whether the byte sequence meets a predetermined or configurable threshold of similarity with a malware byte sequence of a particular known malware sample of the set of known malware samples; and when said determining whether the byte sequence meets a predetermined or configurable threshold of similarity is affirmative:

classifying the potential malware sample as malware; and treating the malware as a variant of a malware family of the particular known malware sample by adding the potential malware sample to the set of known malware samples as part of a new cluster within the set of known malware samples.

11. The non-transitory computer-readable storage medium of claim 9, wherein said walking the plurality of decision trees based on the input vector comprises:

for each a binary decision tree of the plurality of decision trees:

evaluating an expression involving one or more features of the plurality of features associated with a current node starting with a root node of the binary decision tree and ending at a leaf node of the binary decision tree;

when said evaluating causes a left branch of the current node to be taken, assigning a first value to a portion of the byte sequence corresponding to the current node; and when said evaluating causes a right branch of the current node to be taken, assigning a second value to the portion of the byte sequence.

12. The non-transitory computer-readable storage medium of claim 9, wherein the binary decision trees are Classification and Regression Trees (CART), where each of a node of the CART trees has at most two branches.

13. The non-transitory computer-readable storage medium of claim 9, wherein when the hash value of the malware matches to at least one of the malware hash value of the plurality of malware hash values corresponding to the at least one of known malware sample of the set of known malware samples, associating, by the processing resource, the malware with the malware family of the matched at least one of known malware sample.

14. The non-transitory computer-readable storage medium of claim 9, wherein the hash value is calculated by concatenating the generated byte sequence to a unique predefined byte sequence.

15. The non-transitory computer-readable storage medium of claim 9, wherein the plurality of feature vectors comprises any or a combination of entry point information, an import table, resource information, a DOTNET structural data, and a set of text strings pertaining to the potential malware sample.

16. The non-transitory computer-readable storage medium of claim 9, wherein the processing resource is configured on a cloud based service.

17. A computer system comprising:
a processing resource;
a network interface; and
a memory, storing source code for a plurality of modules executable by the processing resource and the plurality of modules comprising:
- a first module to receive potential malware sample, extract a plurality of feature vectors from the potential malware sample, wherein the plurality of feature vectors represent values of static features of the potential malware sample;
- a second module to convert the plurality of feature vectors into an input vector;
- a third module to generate a byte sequence by walking a plurality of decision trees based on the input vector, wherein the plurality of decision trees are associated with a machine-learning model that has been trained based on the static features of a set of known malware samples, wherein the machine-learning model comprises a Random Forest model and wherein the plurality of decision trees comprises binary decision trees;
- a fourth module to calculate a hash value for the byte sequence;
- a fifth module to determine whether the hash value matches a malware hash value of a plurality of malware hash values corresponding to a known malware sample of the set of known malware samples; and
- a sixth module, when said determining is affirmative, to claissify the potential malware sample as malware and associating the malware with a malware family of the known malware sample.

* * * * *